(12) United States Patent
Kon et al.

(10) Patent No.: US 10,589,571 B2
(45) Date of Patent: Mar. 17, 2020

(54) TIRE

(71) Applicant: BRIDGESTONE CORPORATION, Chuo-ku, Tokyo (JP)

(72) Inventors: Seiji Kon, Tokyo (JP); Yoshihide Kouno, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/329,575

(22) PCT Filed: Jul. 24, 2015

(86) PCT No.: PCT/JP2015/071153
§ 371 (c)(1),
(2) Date: Jan. 27, 2017

(87) PCT Pub. No.: WO2016/017555
PCT Pub. Date: Feb. 4, 2016

(65) Prior Publication Data
US 2017/0210171 A1    Jul. 27, 2017

(30) Foreign Application Priority Data

Jul. 30, 2014 (JP) .................. 2014-155166

(51) Int. Cl.
*B60C 5/01* (2006.01)
*B60C 5/14* (2006.01)
(Continued)

(52) U.S. Cl.
CPC ............. *B60C 9/0207* (2013.01); *B60C 5/01* (2013.01); *B60C 9/14* (2013.01); *B60C 15/0018* (2013.01);
(Continued)

(58) Field of Classification Search
CPC .. B60C 5/01; B60C 15/06; B60C 5/14; B60C 5/142; B60C 5/16
See application file for complete search history.

(56) References Cited

U.S. PATENT DOCUMENTS 3,719,218 A * 3/1973 Leybourne, III ......... B60C 9/20
152/527
3,841,376 A * 10/1974 Paulin .................... B29D 30/54
152/532
(Continued)

FOREIGN PATENT DOCUMENTS

| CN | 102555677 A | 7/2012 |
| CN | 103079802 A | 5/2013 |

(Continued)

OTHER PUBLICATIONS

Extended European Search Report dated Jul. 4, 2017, issued in corresponding EP Patent Application EP 15828129.5.
(Continued)

*Primary Examiner* — Justin R Fischer
(74) *Attorney, Agent, or Firm* — Solaris Intellectual Property Group, PLLC

(57) ABSTRACT

A tire whose pressure-proofing performance and impact durability can be improved, is provided. The tire includes: a tire frame member which is made of resin and includes: a bead portion covering a bead core; a side portion extending outwardly in a tire radial direction from the bead portion; and a crown portion extending inwardly in a tire width direction from the side portion, and the tire also includes a reinforcing layer which includes plural cords covered by resin or rubber and which extends from the bead portion to the side portion of the tire frame member to cover at least an inner peripheral surface of the side portion.

5 Claims, 8 Drawing Sheets

(51) Int. Cl.
*B60C 15/06* (2006.01)
*B60C 9/02* (2006.01)
*B60C 9/14* (2006.01)
*B60C 15/00* (2006.01)
*B60C 9/04* (2006.01)

(52) U.S. Cl.
CPC .. *B60C 15/0027* (2013.01); *B60C 2009/0215* (2013.01); *B60C 2009/0416* (2013.01)

(56) References Cited

U.S. PATENT DOCUMENTS

| | | |
|---|---|---|
| 4,277,295 A | 7/1981 | Schmidt et al. |
| 4,453,993 A | 6/1984 | Rau et al. |
| 4,711,284 A | 12/1987 | Schmidt |
| 2010/0108229 A1 | 5/2010 | Hata |
| 2012/0118465 A1 | 5/2012 | Majumdar et al. |
| 2012/0298279 A1 | 11/2012 | Tanno et al. |
| 2013/0139938 A1 | 6/2013 | Kouno et al. |
| 2015/0007921 A1* | 1/2015 | Tsunoda .................. B60C 5/01 152/510 |

FOREIGN PATENT DOCUMENTS

| | | | |
|---|---|---|---|
| DE | 3515944 | * | 11/1986 |
| EP | 0425299 | A2 | 5/1991 |
| GB | 743195 | * | 1/1956 |
| GB | 975106 | * | 11/1964 |
| GB | 1417968 | * | 12/1975 |
| JP | S55-39398 | A | 3/1980 |
| JP | S58-212931 | A | 12/1983 |
| JP | S61-220903 | A | 10/1986 |
| JP | H3-143701 | A | 6/1991 |
| JP | H5-8615 | A | 1/1993 |
| JP | 2009-39901 | A | 2/2009 |
| JP | 2010-111224 | A | 5/2010 |
| JP | 2012-61893 | A | 3/2012 |
| JP | 2013-180621 | A | 9/2013 |
| JP | 2013-220692 | A | 10/2013 |
| WO | WO 2013/122157 | * | 8/2013 |

OTHER PUBLICATIONS

Search Report of the Chinese office action dated Jun. 11, 2018, from the SIPO in a Chinese patent application corresponding to the instant patent application.

* cited by examiner

TIRE

TECHNICAL FIELD

The present invention relates to a tire whose tire frame member is formed using a resin material.

BACKGROUND ART

In view of weight reduction or ease of recycling, it has been proposed to employ as a tire material the likes of a thermoplastic resin and thermoplastic elastomer, and, for example, Japanese Patent Application Laid-Open Publication No. H3-143701 discloses a pneumatic tire whose tire main body is molded using a thermoplastic high polymer material.

In the pneumatic tire described in Japanese Patent Application Laid-Open Publication No. H3-143701, rigidity is increased by providing a reinforcing layer in a tread bottom portion. However, if the tire main body has its walls thinned for purposes of weight reduction and tire longitudinal spring reduction, then pressure-withstanding performance or impact durability end up deteriorating.

SUMMARY OF INVENTION

In view of the above-described facts, an aspect of the present invention has an object of providing a tire whose pressure-withstanding performance and impact durability can be improved.

A tire according to a first aspect of the present invention includes: a tire frame member which is made of resin, the tire frame member including: a bead portion covering a bead core; a side portion extending outwardly in a tire radial direction from the bead portion; and a crown portion extending inwardly in a tire width direction from the side portion; and a reinforcing layer including a plurality of cords that are covered by resin or rubber, the reinforcing layer extending from the bead portion to the side portion of the tire frame member to cover at least an inner peripheral surface of the side portion.

Due to the above-described configuration, a reinforcing layer extending from a bead portion to a side portion of a tire frame member covers an inner peripheral surface of the side portion, hence deterioration of pressure-withstanding performance or impact durability can be suppressed, even if the tire frame member has its walls thinned.

A tire according to a second aspect of the present invention is the tire according to the first aspect, wherein an end on an inner side in the tire radial direction of the reinforcing layer extends to at least an inner end in the tire radial direction of the tire frame member.

Due to the above-described configuration, an end on an inner side in the tire radial direction of the reinforcing layer extends to an inner end in the tire radial direction of the tire frame member, hence a tensile force occurring in the tire frame member can be borne by the reinforcing layer. Therefore, pressure-withstanding performance can be improved.

A tire according to a third aspect of the present invention is the tire according to the second aspect, wherein the end on the inner side in the tire radial direction of the reinforcing layer extends from the inner peripheral surface of the side portion to an outer peripheral surface of the bead portion along an inner peripheral surface of the bead portion.

Due to the above-described configuration, the end on the inner side in the tire radial direction of the reinforcing layer extends from the inner peripheral surface of the side portion to an outer peripheral surface of the bead portion along an inner peripheral surface of the bead portion, hence the tensile force occurring in the tire frame member can be more largely borne by the reinforcing layer. Therefore, pressure-withstanding performance can be further improved.

A tire according to a fourth aspect of the present invention is the tire according to any of the first through third aspects, wherein the reinforcing layers respectively extend from the bead portions of the tire frame member to an inner peripheral surface of the crown portion.

Due to the above-described configuration, two of the reinforcing layers respectively extend from the bead portions of the tire frame member to an inner peripheral surface of the crown portion. As a result of the reinforcing layer being extended to the inner peripheral surface where tensile stress due to bending becomes largest, of the crown portion, impact durability can be improved when the tire has run onto the likes of a projection on a road surface.

A tire according to a fifth aspect of the present invention is the tire according to the fourth aspect, wherein ends on an outer side in the tire radial direction of the reinforcing layers overlap.

Due to the above-described configuration, fellow ends on an outer side in the tire radial direction of the reinforcing layers overlap, hence more of the tensile force can be borne by the reinforcing layer. Therefore, pressure-withstanding performance can be further improved.

A tire according to a sixth aspect of the present invention is the tire according to any of the first through fifth aspects, wherein a plurality of cuts are formed in the tire radial direction, in the end on the inner side in the tire radial direction of the reinforcing layer.

Due to the above-described configuration, a plurality of cuts are formed in the end on the inner side in the tire radial direction of the reinforcing layer. Therefore, during molding, the reinforcing layers overlap by a cut portion on a bead side where diameter is small, hence occurrence of wrinkles of the reinforcing layers can be suppressed.

A tire according to a seventh aspect of the present invention is the tire according to any of the first through sixth aspects, wherein the plurality of cords of the reinforcing layer each extend in a radial direction to be arranged in line in a tire circumferential direction, and lengths of the plurality of cords change periodically along the tire circumferential direction.

Due to the above-described configuration, lengths of the cords extending in a radial direction change periodically along a tire circumferential direction. In other words, the reinforcing layer has a portion where the cord is short and a portion where the cord is long, hence it can be suppressed that during molding, wrinkles occur in the reinforcing layer on the bead side where diameter is small.

A tire according to an eighth aspect of the present invention is the tire according to any of the first through seventh aspects, wherein an outer peripheral surface of the tire frame member is provided with a rubber covering layer extending from the bead portion to the crown portion, and the end on the inner side in the tire radial direction of the reinforcing layer is covered by the rubber covering layer.

Due to the above-described configuration, an outer peripheral surface of the tire frame member is provided with a rubber covering layer, and the end on the inner side in the tire radial direction of the reinforcing layer is covered by the rubber covering layer. Therefore, detachment from the tire frame member of the reinforcing layer can be suppressed, and fitting of the tire and a rim can be improved.

The aspect of the present invention makes it possible to provide a tire whose pressure-withstanding performance and impact durability can be improved.

DESCRIPTION OF EMBODIMENTS

First Embodiment

Figure 1:
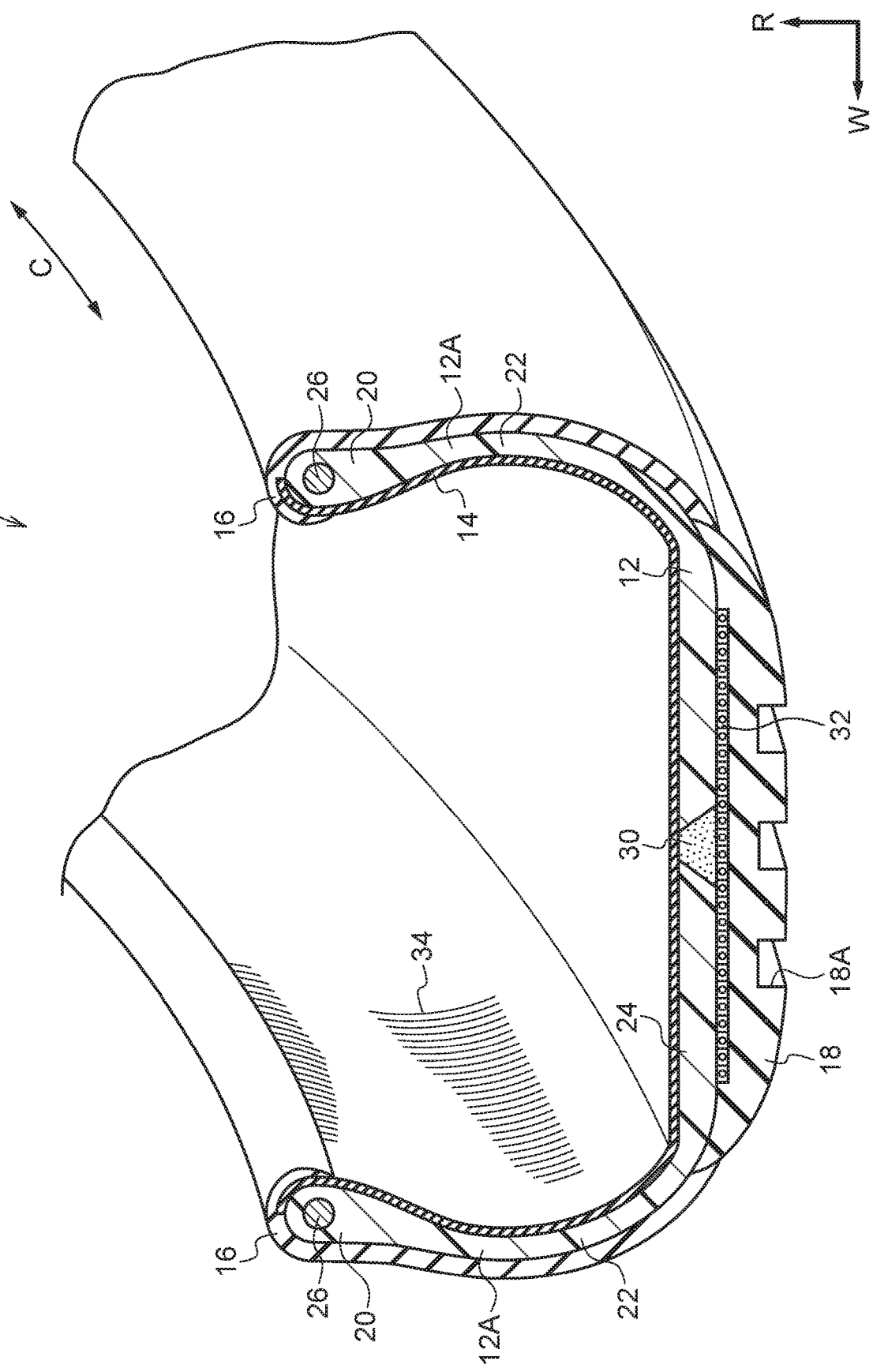
FIG. 1 is a perspective cross-sectional view showing part of a tire according to a first embodiment of the present invention.

A first embodiment of the present invention will be described below with reference to FIGS. 1 and 2. Note that in the drawings, an arrow W indicates a direction parallel to a tire rotational axis (hereafter, defined as a tire width direction), and an arrow R indicates a direction passing through the rotational axis of the tire and orthogonal to the tire width direction (hereafter, defined as a tire radial direction). In addition, an arrow C indicates a circumferential direction of a circle whose center is the rotational axis of the tire (hereafter, defined as a tire circumferential direction). Moreover, a radial direction refers to a direction orthogonal to the tire circumferential direction and is assumed to be a direction including the tire radial direction and the tire width direction.

Figure 2:
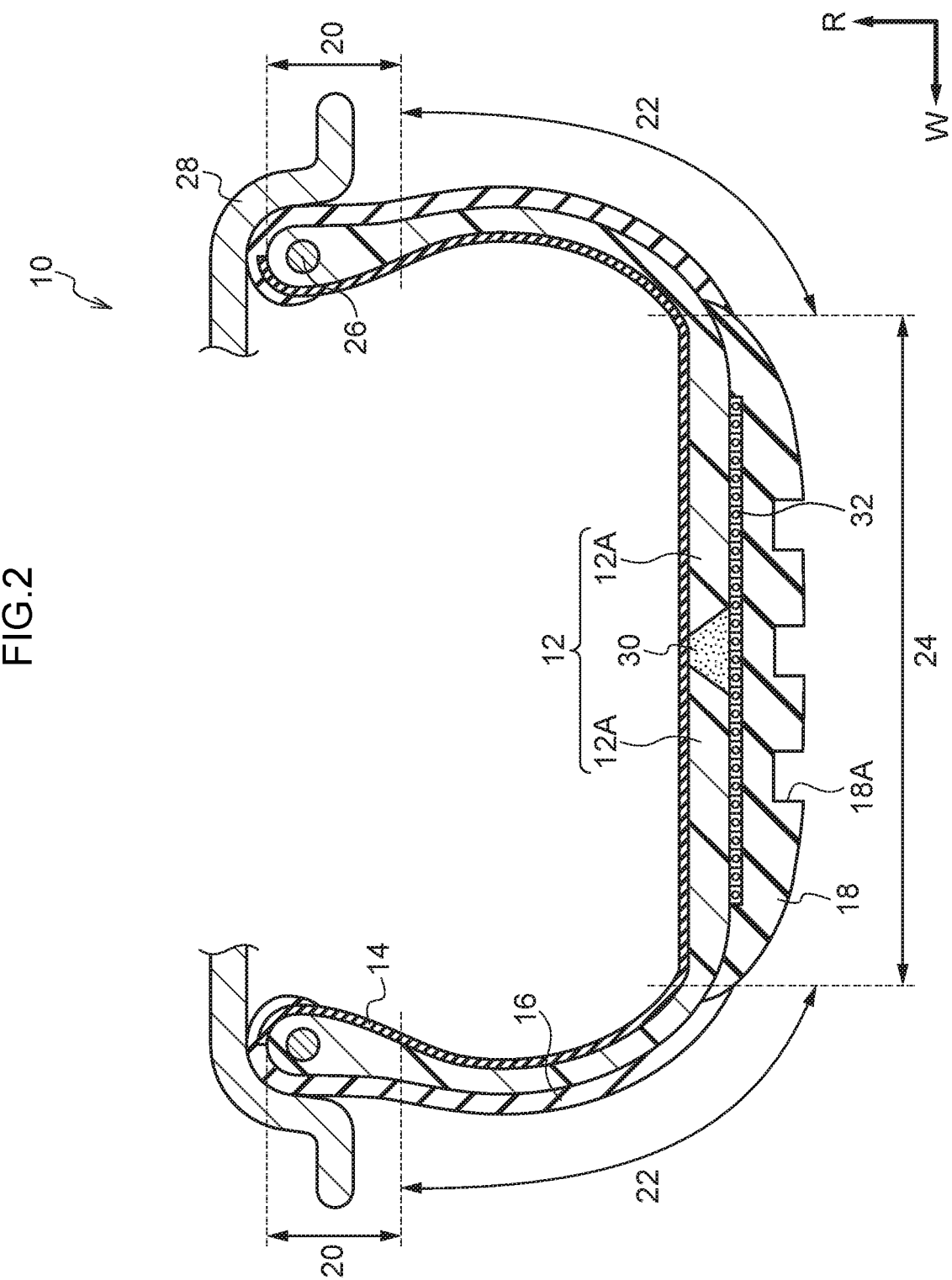
FIG. 2 is a cross-sectional view showing one side of a section taken along a tire axial direction of the tire according to the first embodiment of the present invention.

As shown in FIGS. 1 and 2, a tire 10 according to the first embodiment includes a tire frame member 12, a reinforcing layer 14, a covering rubber layer (rubber covering layer) 16, and a tread rubber 18.

The tire frame member 12 is configured from a resin material, and is configured in an annular shape by joining a pair of tire pieces 12A in a tire axial direction. Note that the tire frame member 12 may be formed by joining three or more of the tire pieces 12A.

In addition, the tire frame member 12 has: a pair of bead portions 20; a pair of side portions 22 respectively extending outwardly in the tire radial direction from the pair of bead portions 20; and a crown portion 24 extending inwardly in the tire width direction from the side portions 22.

Note that here, from an inner end in the tire radial direction to 30% of a tire cross-sectional height of the tire frame member 12 is called the bead portion 20, and a portion where the tread rubber 18 is disposed is called the crown portion 24.

The following can be employed as the resin material configuring the tire frame member 12, namely, the likes of a thermoplastic resin, a thermoplastic elastomer (TPE), and a thermosetting resin that have an equivalent elasticity to rubber. In view of elasticity during running and moldability during manufacturing, a thermoplastic elastomer is desirably employed. Note that all of the tire frame member 12 may be formed by the above-described resin material, or only part of the tire frame member 12 may be formed by the above-described resin material.

The following can be considered as the thermoplastic elastomer, namely, a polyolefin-based thermoplastic elastomer (TPO), a polystyrene-based thermoplastic elastomer (TPS), a polyamide-based thermoplastic elastomer (TPA), a polyurethane-based thermoplastic elastomer (TPU), a polyester-based thermoplastic elastomer (TPC), a dynamically crosslinked-type thermoplastic elastomer (TPV), and so on.

Moreover, the following can be considered as the thermoplastic resin, namely, a polyurethane resin, a polyolefin resin, a vinyl chloride resin, a polyamide resin, and so on. Furthermore, the following can be employed as a thermoplastic material, namely, a thermoplastic material in which, for example, deflection temperature under load (when load is 0.45 MPa) defined in ISO75-2 or ASTM D648 is 78° C. or more, tensile yield strength defined in JIS K7113 is 10 MPa or more, tensile breakdown elongation (JIS K7113) defined similarly in JIS K7113 is 50% or more, and Vicat softening temperature (A method) defined in JIS K7206 is 130° C. or more.

A bead core 26 is buried in the bead portion 20 of the tire frame member 12. The following can be employed as a material configuring the bead core 26, namely, the likes of a metal, an organic fiber, an organic fiber covered by a resin, or a hard resin. Note that if rigidity of the bead portion 20 is secured and there is no problem in fitting to a rim 28 shown in FIG. 2, the bead core 26 may be omitted.

A joining member 30 which is made of resin is provided in a central portion in the tire width direction of the crown portion 24, between the pair of tire pieces 12A of the tire frame member 12. The joining member 30 is formed in a substantially trapezoidal shape when viewed in cross section, and the pair of tire pieces 12A are connected to each other by being joined to both side surfaces of the joining member 30.

Note that the following can be employed as the joining member 30, namely, a thermoplastic material or molten resin of the same kind as or a different kind to the tire piece 12A. Moreover, it is also possible to connect the tire pieces 12A without using the joining member 30.

In this case, it is possible to employ, for example, a hot plate welding method in which a hot plate is sandwiched between ends of the tire pieces 12A and fellow ends are welded by removing the hot plate while the fellow ends are pressed in a direction that they approach each other, or a method in which fellow tire pieces 12A are adhered by an adhesive agent.

An outer peripheral surface of the crown portion 24 is provided with a belt layer 32. This belt layer 32 is configured by, for example, a resin-covered cord being wound spirally in the tire circumferential direction.

The reinforcing layer 14 includes a plurality of reinforcing cords 34 covered by rubber. The reinforcing layer 14 is disposed extending from an inner peripheral surface of one of the bead portions 20 of the tire frame member 12 to an inner peripheral surface of the side portion 22 and passing along an inner peripheral surface of the crown portion 24 to extend to an inner peripheral surface of the other of the bead portions 20.

Moreover, the reinforcing layer 14 is disposed extending over a full circle in the tire circumferential direction. Note that in the present embodiment, both ends of the reinforcing layer 14 each extend to an inner end in the tire radial direction of the tire frame member 12.

The reinforcing cords 34 are monofilaments (single strands) of an organic fiber or multifilaments (twisted strands) having organic fibers twisted therein, and each extend in the radial direction to be arranged in line in the tire circumferential direction. Note that an angle of the reinforcing cord 34 may be inclined in a range of not more than 10 degrees with respect to the radial direction.

The following can be employed as the organic fiber, namely, a material such as nylon or PET, glass, and aramid. Note that a metal such as steel may be employed as a material of the reinforcing cord 34. Moreover, the reinforcing cord 34 may be covered by resin, not rubber.

Outer peripheral surfaces of the bead portions 20 and the side portions 22 of the tire frame member 12 are provided with a pair of the covering rubber layers 16 that extend to an outer side in the tire width direction of the crown portion 24. The covering rubber layer 16 can employ the same kind of rubber as that employed in a sidewall of a conventional rubber-made pneumatic tire.

Note that ends on an inner side in the tire radial direction of the covering rubber layers 16 respectively extend to the inner peripheral surfaces of the bead portions 20 of the tire frame member 12, and both ends of the reinforcing layer 14 are covered by the covering rubber layers 16.

The tread rubber 18 acting as a tread layer is disposed on an outer side in the tire radial direction of the crown portion 24 and the belt layer 32. Note that the reinforcing layer 14, the covering rubber layer 16, the belt layer 32, and the tread rubber 18 are adhered by vulcanized adhesion after being disposed in the tire frame member 12.

The tread rubber 18 is formed by rubber superior in wear resistance to the resin material forming the tire frame member 12, and can employ the same kind of tread rubber as that employed in a conventional rubber-made pneumatic tire.

Moreover, a groove 18A for drainage that extends in the tire circumferential direction is formed in a tread surface of the tread rubber 18. In the present embodiment, three grooves 18A are formed, but the present invention is not limited to this, and even more of the grooves 18A may be formed. Moreover, a publicly known tread pattern is employed as the tread pattern.

Next, actions and effects of the tire 10 according to the present embodiment will be described. In the tire 10 according to the present embodiment, the inner peripheral surface of the tire frame member 12 is covered by the reinforcing layer 14, hence deterioration of pressure-withstanding performance or impact durability can be suppressed, even if the tire frame member 12 has its walls thinned.

Specifically, by reinforcing the tire frame member 12 by the reinforcing layer 14, part of a tensile force occurring in the tire frame member 12 can be borne by the reinforcing layer 14. Therefore, internal pressure can be held, hence pressure-withstanding performance can be improved.

Moreover, as a result of the reinforcing layer 14 being disposed on the inner peripheral surface where tensile stress due to bending becomes largest, of the crown portion 24, impact durability can be improved when the tire 10 has run onto the likes of a projection on a road surface.

Note that because the reinforcing layer 14 is formed by covering the reinforcing cord 34 by rubber, processing is easy. Moreover, since the end on the inner side in the tire radial direction of the reinforcing layer 14 is covered by the covering rubber layer 16, detachment from the tire frame member 12 of the reinforcing layer 14 can be suppressed, and fitting of the tire 10 and the rim 28 can be improved.

Second Embodiment

Next, a second embodiment of the present invention will be described with reference to FIGS. 3 to 5. Note that configurations similar to those of the first embodiment will be assigned with the same reference symbols as in the first embodiment, and descriptions thereof will be omitted.

Figure 3:
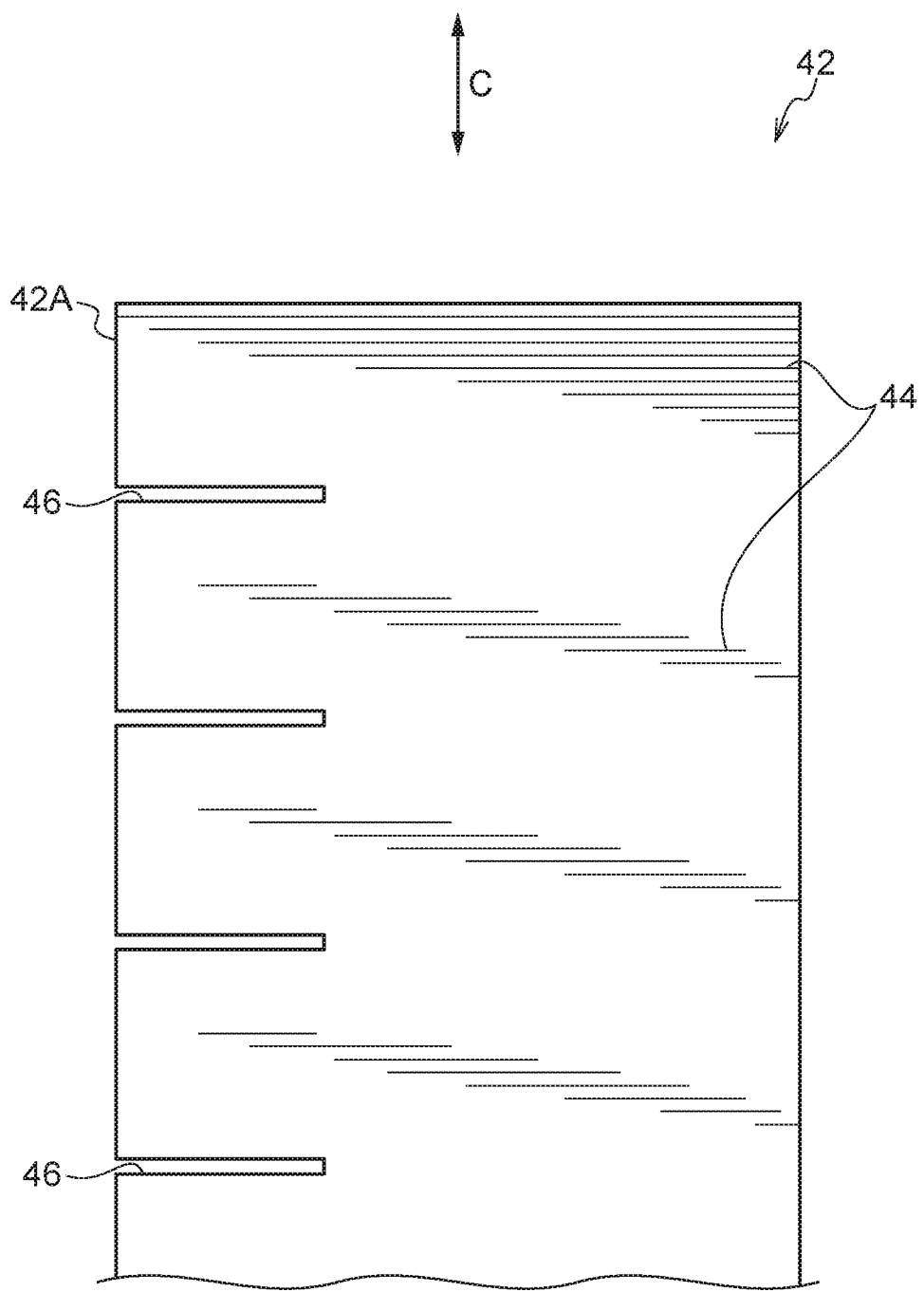
FIG. 3 is a plan view showing a reinforcing layer of a tire according to a second embodiment of the present invention.

FIG. 3 shows a flatly extended state before disposition in the tire frame member 12, of a reinforcing layer 42 according to the present embodiment. Note that a tire 40 according to the second embodiment has a pair of the reinforcing layers 42, as shown in FIGS. 4 and 5.

The reinforcing layer 42, similarly to the reinforcing layer 14 of the first embodiment, is formed by a plurality of reinforcing cords 44 extending in the radial direction being covered by rubber. Moreover, as shown in FIG. 3, a plurality of cuts 46 are formed in an end 42A on one side in a transverse direction.

When the reinforcing layer 42 is disposed in the tire frame member 12, the end 42A having the cuts 46 of the reinforcing layer 42 is disposed so as to be positioned on the inner side in the tire radial direction. Specifically, as shown in FIG. 4, the pair of reinforcing layers 42 are disposed such that the end 42A having the cuts 46 is positioned on the outer peripheral surface of the bead portion 20 of the tire frame member 12.

At this time, the plurality of cuts 46 each extend in the tire radial direction, and in a cut 46 portions, the ends 42A of the reinforcing layers 42 overlap. The reinforcing layers 42 are doubled back from the outer peripheral surfaces to the inner peripheral surfaces of the bead portions 20 to extend to the inner peripheral surfaces of the side portions 22, and ends on the outer side in the tire radial direction of the reinforcing layers 42 are each positioned on the inner side in the tire radial direction of the belt layer 32.

Note that the ends on the inner side in the tire radial direction of the covering rubber layers 16 respectively extend to the inner peripheral surfaces of the bead portions 20 of the tire frame member 12, and the ends 42A of the reinforcing layers 42 are covered by the covering rubber layers 16.

Figure 4:
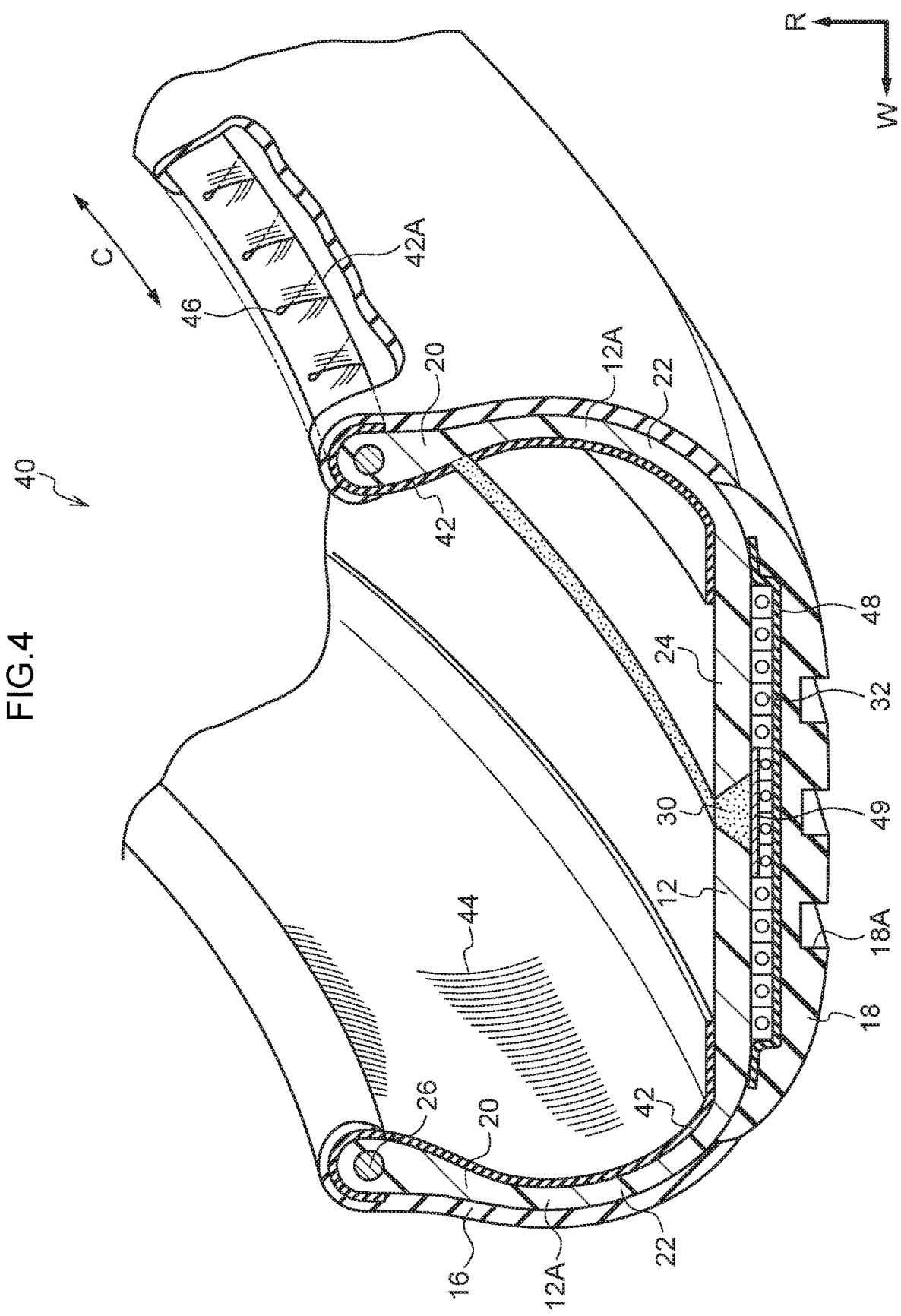
FIG. 4 is a perspective cross-sectional view showing part of the tire according to the second embodiment of the present invention.
Figure 5:
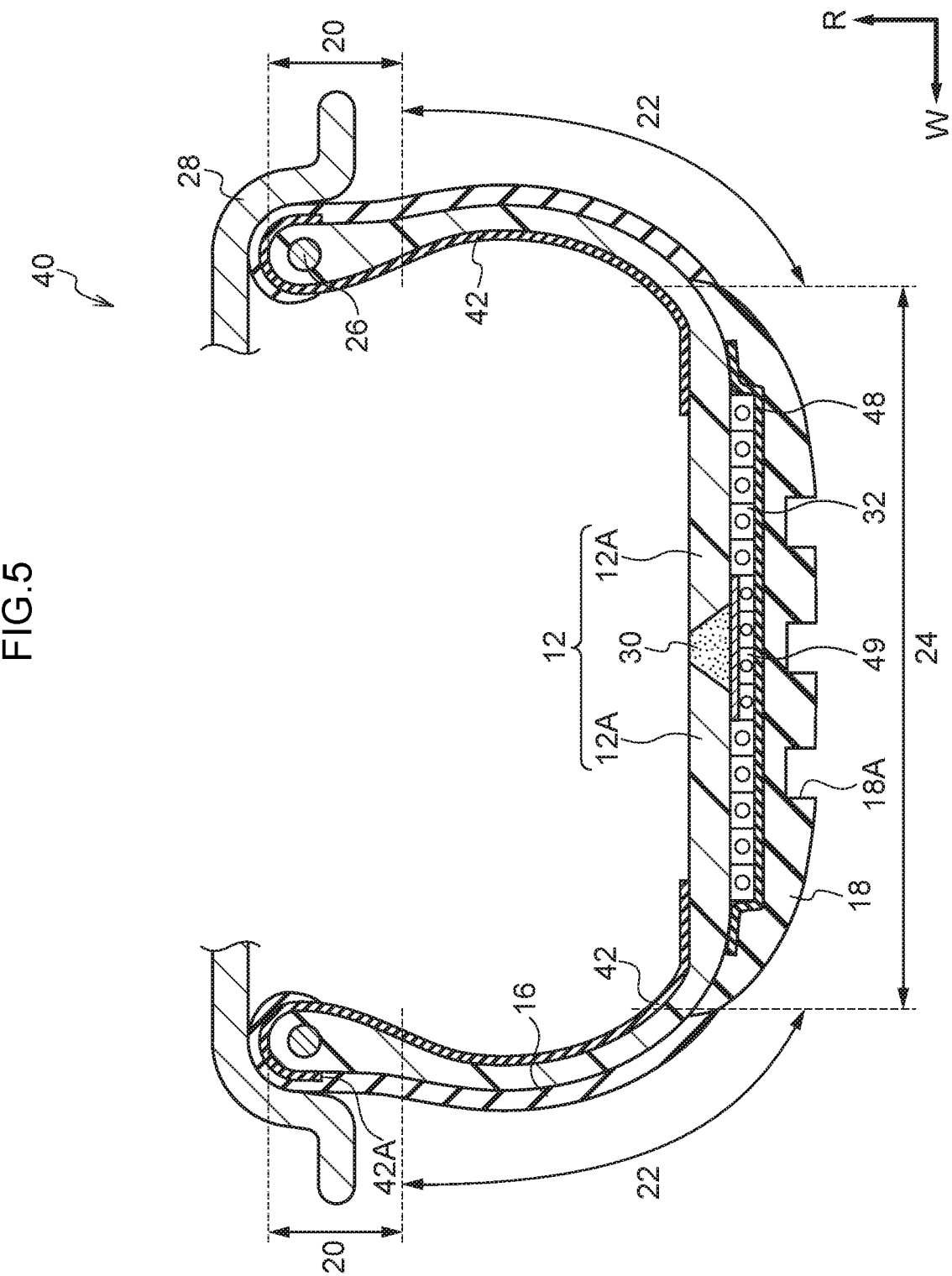
FIG. 5 is a cross-sectional view showing one side of a section taken along a tire axial direction of the tire according to the second embodiment of the present invention.

In addition, as shown in FIGS. 4 and 5, the outer side in the tire radial direction of the crown portion 24 is provided with a crown reinforcing layer 48. The crown reinforcing layer 48 is formed by covering a cord of organic fiber by rubber.

Specifically, the crown reinforcing layer 48 extends along the outer peripheral surface of the belt layer 32, and both ends of the crown reinforcing layer 48 respectively overlap, in the tire radial direction, ends on an outer side in the tire radial direction of the pair of reinforcing layers 42.

Furthermore, a crown auxiliary layer 49 is provided between the crown portion 24 of the tire frame member 12 and the belt layer 32. The crown auxiliary layer 49 is formed by covering an unillustrated cord of organic fiber by resin. A similar resin to that configuring the tire frame member 12, for example, is employed as a material of the covering resin.

Note that the crown auxiliary layer 49 is disposed extending over a full circle in the tire circumferential direction, so as to straddle a central portion in the tire width direction of the crown portion 24, that is, so as to cover the joining member 30 which is a joining portion of the tire pieces 12A of the tire frame member 12.

Next, actions and effects of the tire 40 according to the present embodiment will be described. In the tire 40 according to the present embodiment, the plurality of cuts 46 are formed in the end 42A on the inner side in the tire radial direction of the reinforcing layer 42.

Therefore, when the reinforcing layer 42 is disposed in the tire frame member 12, the reinforcing layer 42 can be overlapped by the cut 46 portion on a bead portion 20 side where diameter is smaller compared to the side portion 22, hence occurrence of wrinkles of the reinforcing layer 42 can be suppressed.

Moreover, since the end 42A of the reinforcing layer 42 extends from the inner peripheral surface of the side portion 22 to the outer peripheral surface of the bead portion 20 along the inner peripheral surface of the bead portion 20, the tensile force occurring in the tire frame member 12 can be more largely borne by the reinforcing layer 42. Therefore, pressure-withstanding performance can be further improved.

In addition, the crown reinforcing layer 48 is provided on the outer side in the tire radial direction of the crown portion 24. As a result of the crown reinforcing layer 48, it can be suppressed that an impact from an outer peripheral side of the tread rubber 18 is transmitted to the tire frame member 12, and impact durability can be improved.

Furthermore, the ends on the outer side in the tire radial direction of the reinforcing layers 42 and the crown reinforcing layer 48 overlap in the tire radial direction. Therefore, as a result of the reinforcing layer and the crown reinforcing layer, more of the tensile force can be borne, hence pressure-withstanding performance can be improved.

Note that the reinforcing layer 42 and the crown reinforcing layer 48 overlap on the outer side in the tire width direction of the belt layer 32. However, they may overlap at any position, provided it is on the outer side in the tire radial direction of the crown portion 24.

Moreover, the crown auxiliary layer 49 covering the joining member 30 is provided between the tire frame member 12 and the belt layer 32. As a result of covering the joining portion where tensile stress due to bending becomes largest and that deforms more easily than another portion, of the crown portion 24, by the crown auxiliary layer 49, deformation can be suppressed whereby impact durability can be improved when the tire 40 has run onto the likes of a projection on a road surface.

Third Embodiment

Figure 7:
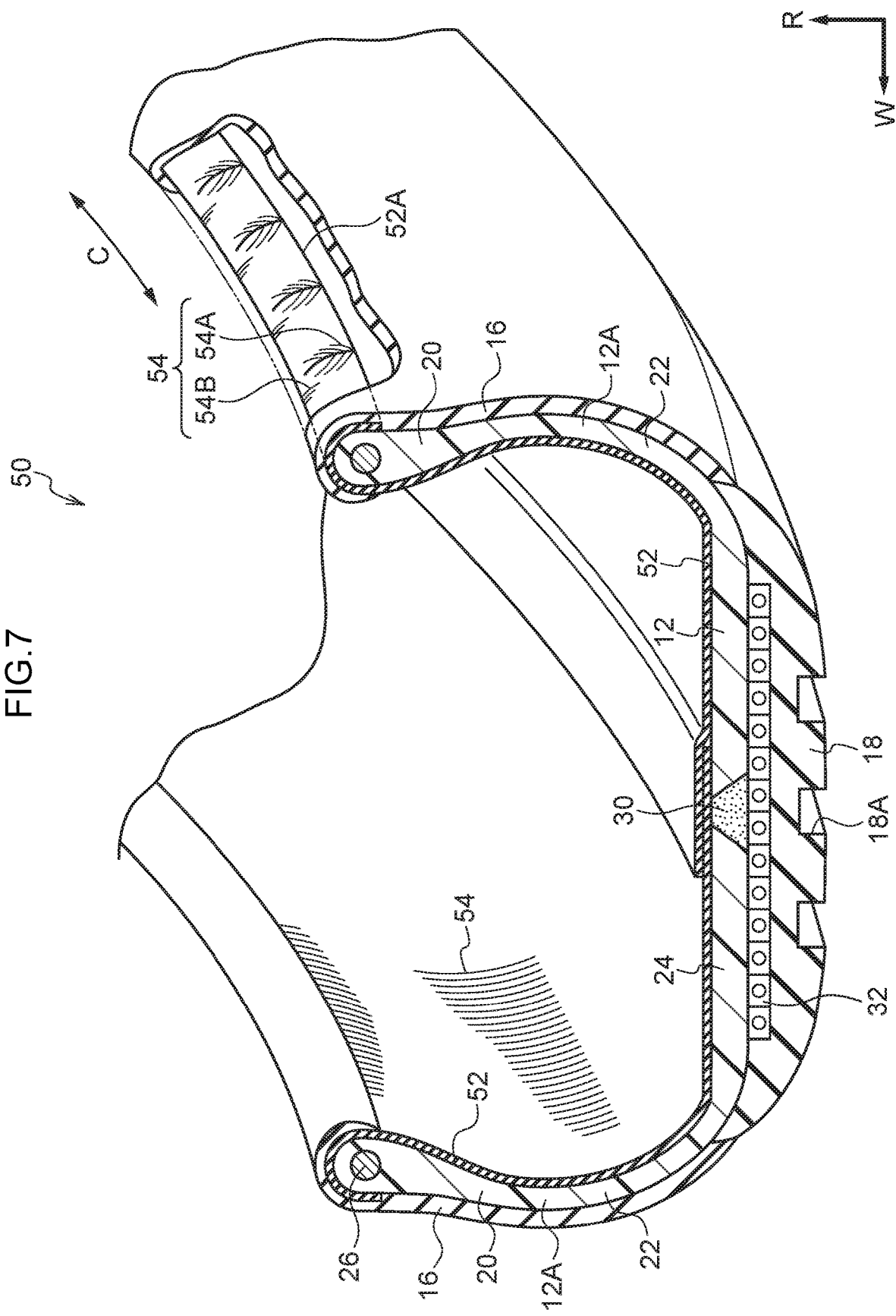
FIG. 7 is a perspective cross-sectional view showing part of the tire according to the third embodiment of the present invention.
Figure 8:
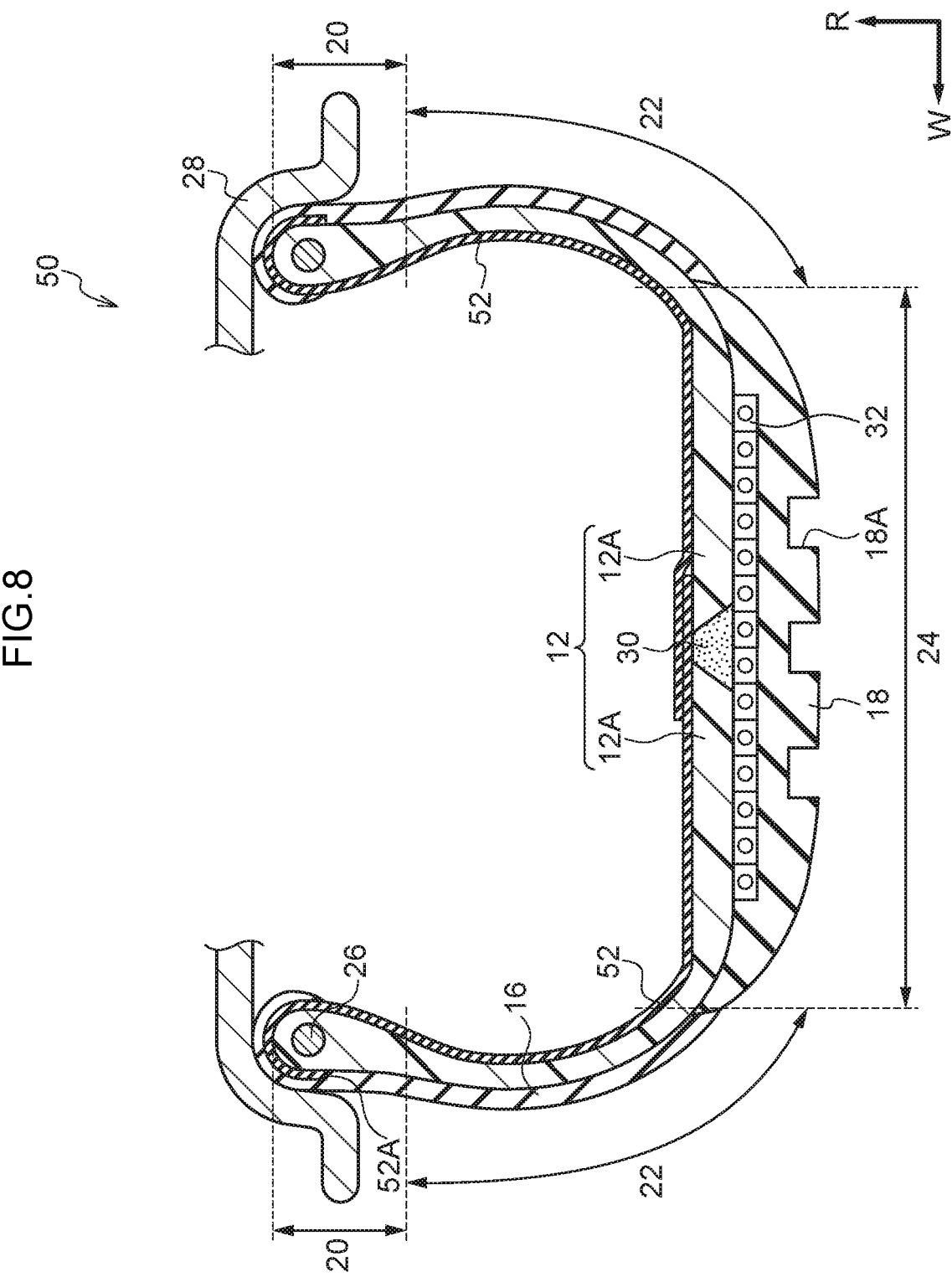
FIG. 8 is a cross-sectional view showing one side of a section taken along a tire axial direction of the tire according to the third embodiment of the present invention.

Next, a third embodiment of the present invention will be described with reference to FIGS. 6 to 8. Note that configurations similar to those of the first embodiment and the second embodiment will be assigned with the same reference symbols as in the first embodiment and the second embodiment, and descriptions thereof will be omitted.

Figure 6:
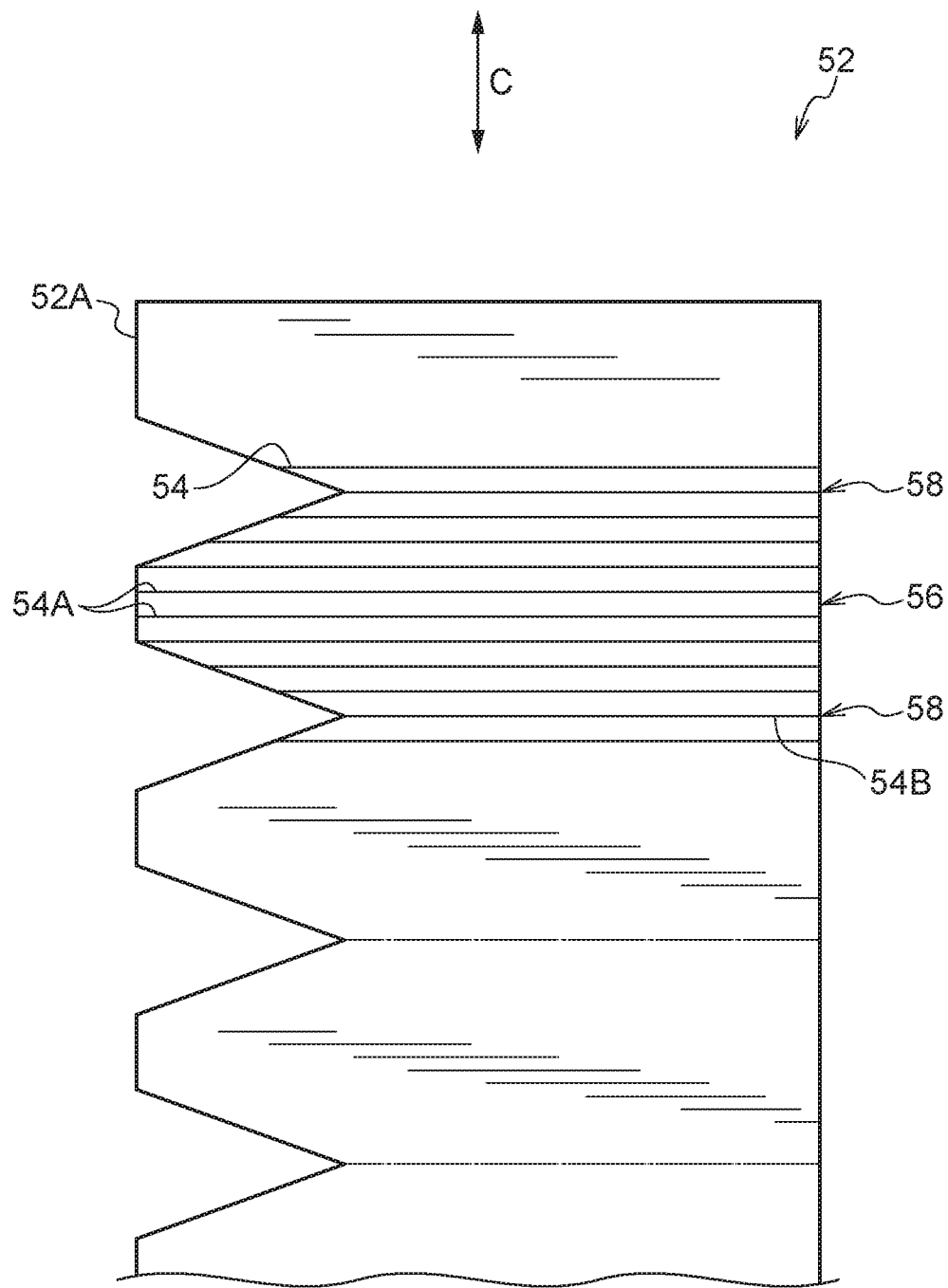
FIG. 6 is a plan view showing a reinforcing layer of a tire according to a third embodiment of the present invention.

FIG. 6 shows a flatly extended state before disposition in the tire frame member 12, of a reinforcing layer 52 according to the present embodiment. Note that a tire 50 according to the third embodiment has a pair of the reinforcing layers 52, as shown in FIGS. 7 and 8.

The reinforcing layer 52, similarly to the reinforcing layers 14 and 42 of the first embodiment and the second embodiment, is formed by a plurality of reinforcing cords 54 extending in the radial direction being covered by rubber.

Moreover, as shown in FIG. 6, lengths of each of the reinforcing cords 54 change periodically along the tire circumferential direction.

Specifically, a width of the reinforcing layer 52 changes periodically between a maximum width portion 56 where a longest reinforcing cord 54 is buried and a minimum width portion 58 where a shortest reinforcing cord 54 is buried.

Note that an end 52A on one side in a transverse direction of the reinforcing layer 52 is extended to only by a long reinforcing cord 54A, and the end 52A is configured in a periodically notched shape, from the maximum width portion 56 to the minimum width portion 58.

When the reinforcing layer 52 is disposed in the tire frame member 12, the end 52A to which only the long reinforcing cord 54A extends is disposed so as to be positioned on the inner side in the tire radial direction. Specifically, as shown in FIG. 7, the pair of reinforcing layers 52 are disposed such that the end 52A is positioned on the outer peripheral surface of the bead portion 20 of the tire frame member 12.

At this time, a short reinforcing cord 54B only reaches the inner peripheral surface of the bead portion 20, and only the long reinforcing cord 54A reaches the outer peripheral surface of the bead portion 20. Therefore, there is no risk that fellow reinforcing cords 54 overlap in the bead portion 20.

Note that the ends on the inner side in the tire radial direction of the covering rubber layers 16 respectively extend to the inner peripheral surfaces of the bead portions 20 of the tire frame member 12, and the ends 52A of the reinforcing layers 52 are covered by the covering rubber layers 16.

The reinforcing layer 52 is doubled back from the outer peripheral surface to the inner peripheral surface of the bead portion 20 and passes along the inner peripheral surface of the side portion 22 to extend to the inner peripheral surface of the crown portion 24. At this time, ends on the outer side in the tire radial direction of the pair of reinforcing layers 52 overlap on the inner peripheral surface of the crown portion 24.

Note that a position where fellow reinforcing layers 52 overlap may be any position provided it is on the inner side in the tire radial direction of the crown portion 24. However, overlapping desirably occurs at a position on the inner side in the tire radial direction of the joining member 30 which is the joining portion of the tire pieces 12A of the tire frame member 12.

Next, actions and effects of the tire 50 according to the present embodiment will be described. In the tire 50 according to the present embodiment, fellow ends on the outer side in the tire radial direction of the reinforcing layers 52 overlap.

As a result of covering the joining portion where tensile stress due to bending becomes largest and that deforms more easily than another portion, of the crown portion 24, by the pair of reinforcing layers 52, deformation can be suppressed whereby impact durability can be improved when the tire 50 has run onto the likes of a projection on a road surface. Moreover, since more of the tensile force can be borne by the reinforcing layer 52, pressure-withstanding performance can be further improved.

Moreover, lengths of each of the reinforcing cords 54 of the reinforcing layer 52 change periodically along the tire circumferential direction. Therefore, the short reinforcing cord 54B only reaches the inner peripheral surface of the bead portion 20, and only the long reinforcing cord 54A reaches the outer peripheral surface of the bead portion 20.

Therefore, when the reinforcing layer 52 is disposed in the tire frame member 12, there is no risk that fellow reinforcing cords 54 overlap on the bead portion 20 side where diameter is smaller compared to the side portion 22, and occurrence of wrinkles of the reinforcing layer 52 can be further suppressed.

OTHER EMBODIMENTS

Note that examples of embodiments have been described for the present invention. However, the present invention is not limited to such embodiments, and various other embodiments are possible within the scope of the present invention.

For example, the above-described reinforcing layers 14, 42, and 52 were disposed extending over a full circle in the tire circumferential direction. However, the reinforcing layer may be formed by arranging in line in the tire circumferential direction a plurality of reinforcing layer pieces extending in the radial direction.

In that case, if shapes of the reinforcing layer pieces are each configured tapered toward a side of their end positioned on the inner side in the tire radial direction, then there is no risk that fellow reinforcing layer pieces overlap on the bead portion 20 side where diameter is small.

Moreover, in the second embodiment, it is possible for the plurality of cuts to be formed in an end on the outer side in the tire radial direction, not in the end 42A on the inner side in the tire radial direction of the reinforcing layer 42, and for the reinforcing layer 42 to be disposed conforming to the bead portion 20.

In that case, when the reinforcing layer 42 is disposed in the tire frame member 12, the reinforcing layer 42 can be disposed in a state where a gap of the cut portion is broadened, on a side portion 22 side where diameter is larger compared to the bead portion 20. Therefore, occurrence of wrinkles of the reinforcing layer 42 can be suppressed.

Furthermore, the first through third embodiments can be appropriately combined. For example, the reinforcing layer 14 of the first embodiment can be configured having the cuts 46 like in the reinforcing layer 42 of the second embodiment. Moreover, the tire 50 of the third embodiment may also be configured including the crown auxiliary layer 49 like in the tire 40 of the second embodiment.

The disclosure of Japanese Patent Application No. 2014-155166 filed on Jul. 30, 2014 is incorporated in the present specification by reference in its entirety.

All of the documents, patent applications, and technical standards described in the present specification are incorporated by reference in the present specification to the same degree as if what was incorporated by reference by the individual documents, patent applications, and technical standards was specifically and individually described.

The invention claimed is:

1. A tire comprising:
a tire frame member which is made of resin, the tire frame member including: a bead portion covering a bead core; a side portion extending outwardly in a tire radial direction from the bead portion; and a crown portion extending inwardly in a tire width direction from the side portion; and
a reinforcing layer comprising a plurality of cords that are covered by resin or rubber, the reinforcing layer extending from the bead portion to the side portion of the tire frame member to cover at least an inner peripheral surface of the side portion,
wherein an end on an inner side, in the tire radial direction, of the reinforcing layer extends to at least an inner end, in the tire radial direction, of the tire frame member,
wherein the end on the inner side, in the tire radial direction, of the reinforcing layer extends from the inner peripheral surface of the side portion to an outer peripheral surface of the bead portion along an inner peripheral surface of the bead portion, and
wherein an outer peripheral surface of the tire frame member is provided with a rubber covering layer extending from the bead portion to the crown portion, and the end on the inner side in the tire radial direction of the reinforcing layer is covered by the rubber covering layer.

2. The tire according to claim 1, wherein
a pair of reinforcing layers respectively extend from a pair of bead portions of the tire frame member to an inner peripheral surface of the crown portion.

3. The tire according to claim 2, wherein
ends on an outer side in the tire radial direction of the pair of reinforcing layers overlap.

4. The tire according to claim 1, wherein
a plurality of cuts are formed in the end on the inner side in the tire radial direction of the reinforcing layer.

5. The tire according to claim 1, wherein
the plurality of cords of the reinforcing layer each extend in a radial direction to be arranged in line in a tire circumferential direction, and lengths of the plurality of cords change periodically along the tire circumferential direction.

* * * * *